(No Model.)
J. T. MEATS.
CLUTCH PULLEY OR GEAR.
No. 306,274. Patented Oct. 7, 1884.
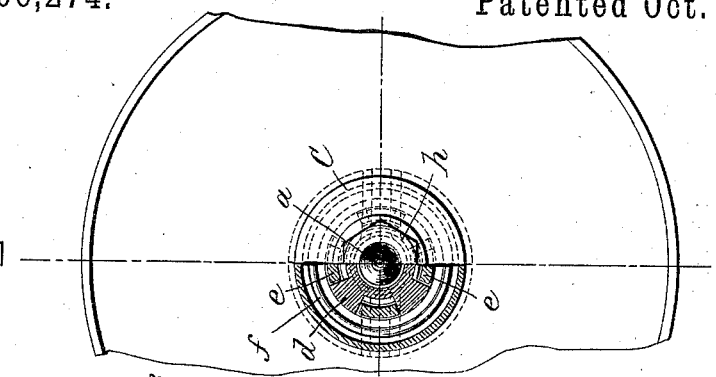
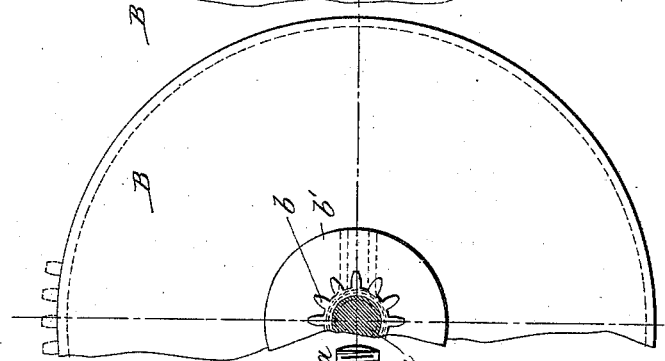
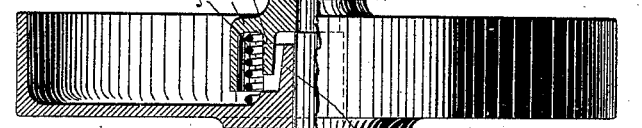
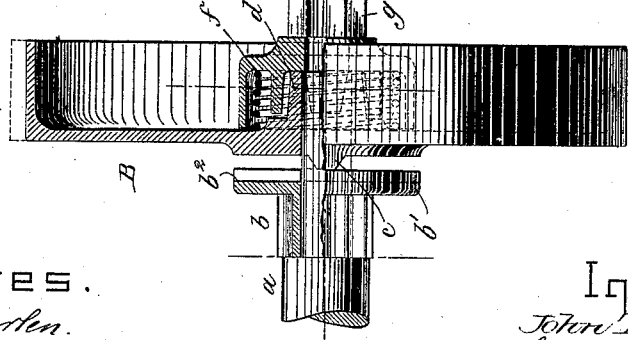
Witnesses.
Arthur Zipperlen.
John F. C. Printlert.
Inventor.
John T. Meats.
by Crosby & Gregory
attys.
N. PETERS, Photo-Lithographer, Washington, D. C.

UNITED STATES PATENT OFFICE.

JOHN T. MEATS, OF TAUNTON, MASSACHUSETTS.

CLUTCH PULLEY OR GEAR.

SPECIFICATION forming part of Letters Patent No. 306,274, dated October 7, 1884.

Application filed August 25, 1884. (No model.)

*To all whom it may concern:*

Be it known that I, JOHN T. MEATS, of Taunton, county of Bristol, State of Massachusetts, have invented an Improvement in Clutch Pulley or Gear, of which the following description, in connection with the accompanying drawings, is a specification, like letters on the drawings representing like parts.

This invention has for its object to simplify and improve the construction of clutch-pulleys.

The particular features in which my invention consists will be hereinafter fully set forth, and specified in the claims at the end of the specification.

My improved clutch pulley or gear is composed, essentially, of a driven body having a yielding hub, the body being provided with suitable projections to enter or slip out from notches in a toothed sleeve.

Figure 1 is a broken elevation of a pulley or gear embodying my invention, the body being shown as disengaged from the toothed sleeve, the teeth to form the gear being in dotted lines. Fig. 2 is a like elevation with the parts in clutch. Fig. 3 is a partial inner side view of my improved pulley or gear, and Fig. 4 is a partial front view broken out to show the construction of the yielding parts of the hub of the body of the pulley or gear.

The shaft $a$ has mounted upon it what I denominate a "toothed sleeve," composed, essentially, of a pinion or gear, $b$, having attached to it a disk or hub, $b'$, provided with one or more notches, $b^2$, into which may enter a projection, $c$, forming part of the driven body B, which may be a pulley to receive a belt, or may have teeth, as shown by dotted lines, to be driven positively by another gear. The body B has an attached hub, $d$, suitably notched to receive fingers $e$ of a collar, C, grooved to receive a spiral spring, $f$, the latter being thus interposed between the body part B and the collar C, the latter, in connection with the projection $d$ and the spring, forming a yielding hub for the said body part.

The body part B and the collar C are kept upon the shaft $a$ by means of a nut, $g$, and a check-nut, $h$, turned upon the screw-threaded end of the said shaft. The farther the said nuts are screwed upon the shaft the greater the compression of the spring and the contraction of the yielding hub, and consequently the greater the strain required to permit the projection $c$ of the body part to slip out from engagement with the recess $b^2$ of the disk or plate $b'$, or, in other words, the greater the strain to be exerted to permit the clutch pulley or gear to slip with relation the one part to the other.

The clutch-pulley, or it may be a gear, is applicable for use in various machines.

I claim—

1. The clutch composed of the body part, the toothed sleeve, and the collar, and spring between it and the said body part, to operate substantially as described.

2. The body part B, provided with the notched hub $d$, combined with the collar C, provided with the fingers, and with the spring $f$ interposed between them, substantially as described.

In testimony whereof I have signed my name to this specification in the presence of two subscribing witnesses.

JOHN T. MEATS.

Witnesses:
  G. W. GREGORY,
  J. H. LANGE.